Aug. 29, 1933.　　　A. W. SIZER　　　1,925,010

MOLDING MACHINE

Filed Sept. 2, 1931

INVENTOR
Albert W. Sizer,
BY
ATTORNEYS

Patented Aug. 29, 1933

1,925,010

UNITED STATES PATENT OFFICE 1,925,010

MOLDING MACHINE

Albert William Sizer, Hessle, England

Application September 2, 1931. Serial No. 560,846

1 Claim. (Cl. 146—186)

The present invention relates to improvements in molding machines suitable for the moulding of plastic material into the form of cakes or pellets and of the type in which material from a feed hopper is fed by a rotating worm through a ported die plate to be severed on extrusion by a rotating knife.

It has been found that with this type of machine the length of pellet tends to be irregular owing to the fact that the material sinks by gravity to the lower side of the worm and therefore, more material is fed by the worm in a given time through the perforations on the lower half of the die plate than is fed at the same time through the perforations in the upper half of the die plate.

To avoid this disadvantage it has been proposed to use a worm which consists of a plurality of sections, each section of which includes substantially a single complete thread convolution, each section having an angular lead of 180° as compared with the neighbouring section.

In order to obtain a wholly even feed through the material, so that even in the manufacture of small pellets, which are for instance, used in the feeding of chickens, an equal number and size of pellets is extruded from the top of the die plate as from the base, and thereby a more even product with a greater output obtained. According to this invention a worm is used having a number of juxtaposed sections, each section including a single complete thread convolution, one section having an angular lead of substantially 270° as compared with a neighbouring section.

The invention is more particularly described with reference to the accompanying drawing in which:—

Figure 1:
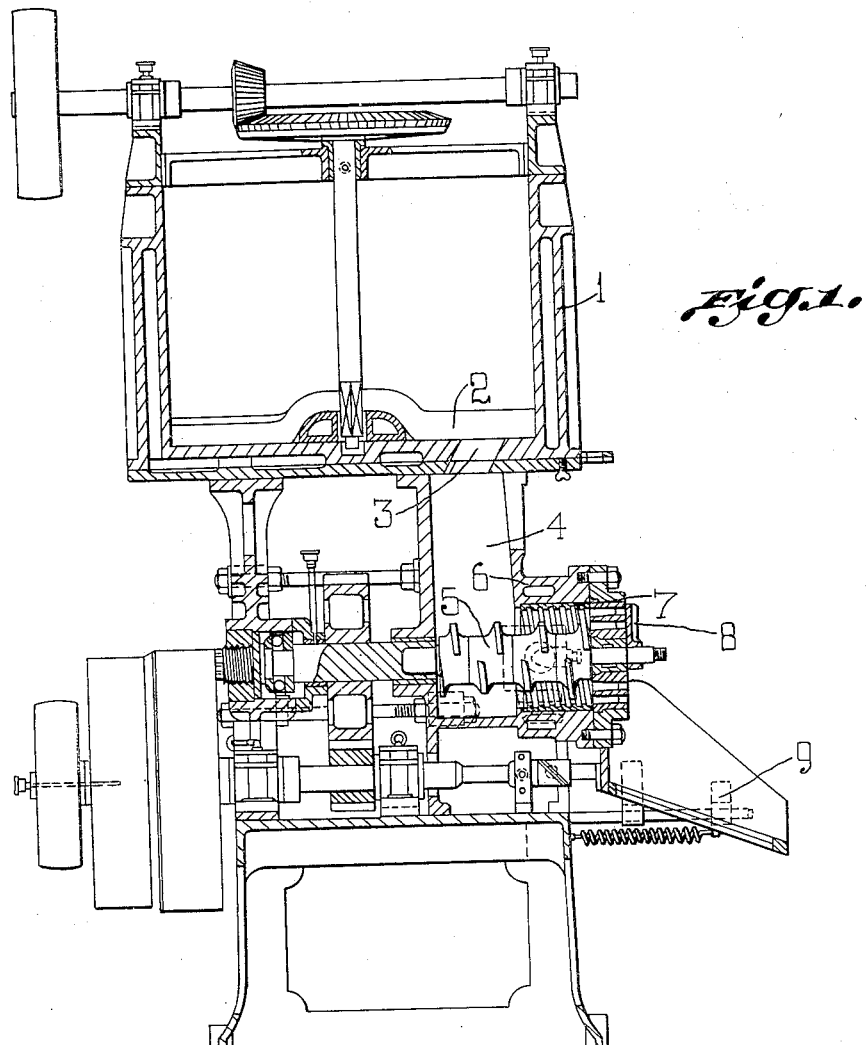
Figure 1 is a sectional elevation through one form of machine.
Figure 2:
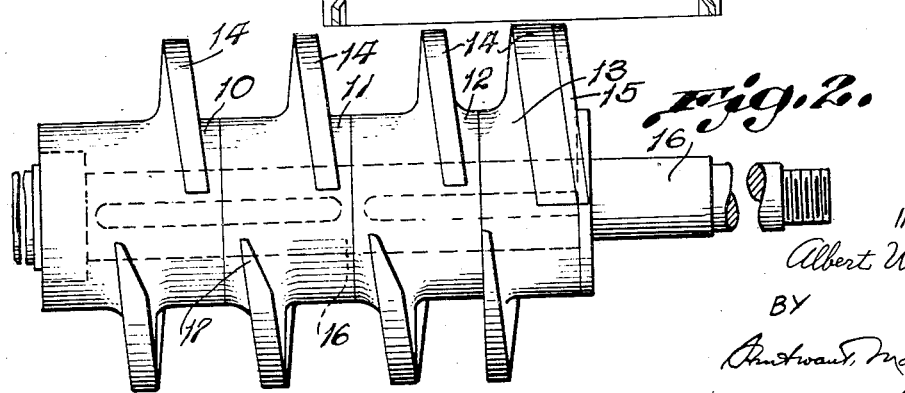
Figure 2 is a detail view of the worm.

The machine can be of any usual type, such as for instance, comprising a jacketed kettle 1 with rotary stirrer 2 in which meal is cooked and mixed and passed through an opening 3 into a feed hopper 4 to be taken up by the feed worm 5, and fed through the cylindrical casing 6 through perforations in a die plate 7 to be cut off by a rotating knife 8, whereupon the cakes or pellets fall down a chute 9 into a suitable container.

As shown, the worm consists of a plurality of sections 10, 11, 12, 13, the trailing section 13 of which may be if desired, provided with a renewable working face or slipper 15. This worm is formed by cutting a single thread 14 upon a former, which will of course, be of considerably greater length than the finished worm shown. These sections are then cut into individual pieces, each comprising one complete thread convolution 14, the short piece of which thread end 14 is then removed by milling or otherwise. The leading edge 17 of which worm section 14 is then bevelled off as shown, and each of the sections 10, 11, 12, 13 are then assembled upon a driving shaft 16 and are keyed thereto, being assembled at 270° out of phase with one another, so that for instance, the leading edge 17 of one section 14 lies on its continuation between the normal pitch of the thread convolutions 14.

I declare that what I claim is:—

An extrusion press for molding cattle cake, pellets or the like, comprising a cylindrical body having a hopper opening a perforated die plate closing its end, a rotary stripper moving over the exterior of said die plate and an extrusion worm comprising a number of sections keyed to a common driving shaft, each section comprising substantially a single whole thread convolution, each thread convolution being displaced 270° in phase to the next.

ALBERT WILLIAM SIZER.